US008303086B2

(12) United States Patent
Uchiyama

(10) Patent No.: US 8,303,086 B2
(45) Date of Patent: Nov. 6, 2012

(54) LYOPHOBIC TREATMENT METHOD, NOZZLE PLATE, INKJET HEAD AND ELECTRONIC DEVICE

(75) Inventor: Hiroki Uchiyama, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 331 days.

(21) Appl. No.: 12/728,895

(22) Filed: Mar. 22, 2010

(65) Prior Publication Data

US 2010/0238236 A1 Sep. 23, 2010

(30) Foreign Application Priority Data

Mar. 23, 2009 (JP) ................................ 2009-070608

(51) Int. Cl.
*B05D 5/00* (2006.01)
*B23P 17/00* (2006.01)
*B41J 2/14* (2006.01)

(52) U.S. Cl. .......................... 347/47; 29/890.1; 427/466

(58) Field of Classification Search .................... 347/47; 29/890.1; 427/256, 466
See application file for complete search history.

(56) References Cited

U.S. PATENT DOCUMENTS 7,814,657 B2 * 10/2010 Yokouchi .................... 29/890.1
8,012,538 B2 * 9/2011 Yokouchi ...................... 427/256

FOREIGN PATENT DOCUMENTS

JP 06-316079 A 11/1994
JP 2007-261070 A 10/2007

* cited by examiner

*Primary Examiner* — Lamson Nguyen
(74) *Attorney, Agent, or Firm* — Fish & Richardson P.C.

(57) ABSTRACT

A lyophobic treatment method for imparting lyophobic properties to a surface of a base material having a hole section, includes: a lyophobic film forming step of forming a lyophobic film on the surface and inner wall faces of the hole section of the base material; a protective member forming step of forming a protective member on the lyophobic film on the surface of the base material; a lyophobic film removal step of removing the lyophobic film on the inner wall faces of the hole section of the base material; a protective member removal step of removing the protective member on the lyophobic film on the surface of the base material; and an ion injection step of injecting ions exhibiting lyophobic properties into at least a peripheral portion of an opening of the hole section in the surface of the base material.

20 Claims, 6 Drawing Sheets

LYOPHOBIC TREATMENT METHOD, NOZZLE PLATE, INKJET HEAD AND ELECTRONIC DEVICE

BACKGROUND OF THE INVENTION

1. Field of the Invention

The present invention relates to a lyophobic treatment method, a nozzle plate, an inkjet head and an electronic device, and more particularly, to technology for lyophobic treatment of a surface of a base material having a hole section.

2. Description of the Related Art

In a recording head used in an inkjet recording apparatus (an inkjet head), if ink adheres to the surface of the nozzle plate (in particular, to the periphery of the nozzle openings), then the ink droplets ejected from the nozzles are thereby affected, giving rise to variation in the ejection direction of the ink droplets and making it difficult to deposit the ink droplets at the prescribed positions on the recording medium, and therefore giving rise to decline in image quality.

Therefore, in order to prevent ink from adhering to the surface of the nozzle plate, various methods have been proposed for forming a lyophobic film on the surface of a nozzle plate (also called "nozzle forming substrate" hereinafter).

Japanese Patent Application Publication No. 2007-261070 describes a method according to which a lyophobic film is formed on the surface (ink ejection surface) of a nozzle forming substrate having nozzle holes and on the inner wall faces of the nozzles, whereupon a protective tape (masking tape) is attached to the lyophobic film formed on the surface of the nozzle forming substrate, a plasma process is applied from the rear surface side of the nozzle forming substrate (the side opposite to the ink ejection surface) with this protective tape in an attached state, thereby removing the lyophobic film on the inner wall faces of the nozzles, and the protective tape is then detached from the nozzle forming substrate. In this way, the surface of the nozzle forming substrate is subjected to lyophobic treatment.

However, in the method described in Japanese Patent Application Publication No. 2007-261070, as shown in FIG. 7A, after forming a lyophobic film 904 on the surface (the upper face in FIGS. 7A and 7B) and the inner wall faces of nozzles of the nozzle forming substrate 900 having nozzle holes 902, a protective tape 906 is attached to the lyophobic film 904 on the surface of the nozzle forming substrate 900 and the lyophobic film 904 on the inner wall faces of the nozzles is removed by carrying out plasma processing from the rear surface side (the lower surface in FIGS. 7A and 7B) of the nozzle forming substrate, but if the removal by plasma processing advances too far, then as shown in FIG. 7B, the lyophobic film 904 is removed excessively up to the peripheral portions of the openings of the nozzle holes 902, and this causes the ink ejection performance and the maintenance characteristics to decline. Furthermore, when the protective tape 906 is bonded onto the lyophobic film 904 on the surface of the nozzle forming substrate 900, the protective tape 906 may not adhere completely to the lyophobic film 904 due to the properties of the lyophobic film 904, and consequently there is also a problem in that non-uniformity is liable to occur in the lyophobic properties. Moreover, in cases such as this, there is a possibility that the excessive removal of the lyophobic film 904 progresses further.

SUMMARY OF THE INVENTION

The present invention has been contrived in view of these circumstances, an object thereof being to provide a lyophobic treatment method whereby lyophobic treatment can be carried out stably and reliably on the surface of a base material having hole sections.

A further object of the present invention is to provide a nozzle plate, an inkjet head and an electronic device having excellent liquid ejection performance and maintenance properties, which comprises a base material on which a lyophobic treatment has been carried out by the lyophobic treatment method.

In order to attain an object of the present invention, one aspect of the present invention is directed to a lyophobic treatment method for imparting lyophobic properties to a surface of a base material having a hole section, comprising: a lyophobic film forming step of forming a lyophobic film on the surface and inner wall faces of the hole section of the base material; a protective member forming step of forming a protective member on the lyophobic film on the surface of the base material; a lyophobic film removal step of removing the lyophobic film on the inner wall faces of the hole section of the base material; a protective member removal step of removing the protective member on the lyophobic film on the surface of the base material; and an ion injection step of injecting ions exhibiting lyophobic properties into at least a peripheral portion of an opening of the hole section in the surface of the base material.

According to this aspect of the invention, after forming a lyophobic film on the surface of the base material and the inner wall faces of the hole section, a protective film is formed on top of the lyophobic film on the surface of the base material and the lyophobic film on the inner wall faces of the hole section of the base material is then removed. By selectively injecting ions (lyophobic species) which display lyophobic properties into at least the peripheral portion of the hole section opening in the surface of the base material, after removing the protective member, lyophobic properties are imparted to the excessively removed portion of the lyophobic film on the surface of the base material which arises due to insufficient adhesion of the protective member, or the like. Therefore, it is possible to carry out lyophobic treatment of the surface of the base material stably and reliably.

In a desirable mode of the present invention, the lyophobic film is a resin type lyophobic film and further comprises a heating step of heating the base material after carrying out the ion injection step. According to this mode, when a resin type lyophobic film (more desirably, a fluorine resin type lyophobic film) is used as the lyophobic film, then by carrying out a heating step, such as annealing, after carrying out the ion injection step, the degree of polymerization of the resin type lyophobic film is raised, the durability is improved, and at the same time, the lyophobic properties of the peripheral portion of the hole section opening, which is the ion injection portion, can be further improved.

Furthermore, in a lyophobic treatment method according to the present invention, a desirable mode is one where the ions are injected by an ion injection method. By means of an ion injection method, it is possible selectively to inject ions displaying lyophobic properties into the peripheral section of the hole section opening in the surface of the base material. Moreover, more desirably, the ions injected into the peripheral section of the hole section opening are ion pieces containing at least fluorine.

Furthermore, a desirable mode of the lyophobic treatment method according to the present invention is one where the ion injection step injects the ions only into a donut-shaped region surrounding the margin of the opening of the hole section in the surface of the base material. According to this mode, it is possible to restrict the processing time relating to ion injection and therefore productivity can be improved.

Furthermore, a desirable mode of the lyophobic treatment method according to the present invention is one where the base material has a plurality of hole sections and the ion injection step injects the ions in a linear region extending across the plurality of hole sections on the surface of the base material. In this case, more desirably, the ion injection step injects ions via a mask having a pattern of openings corresponding to the plurality of hole sections. According to this mode, it is possible to carry out an ion injection process accurately and rapidly with respect to a base material in which a plurality of hole sections are provided at high density.

Moreover, a desirable mode of the lyophobic treatment method according to the present invention is one where the lyophobic film on the inner wall faces of the hole section of the base material is removed by plasma processing. According to this mode, it is possible to render the inner wall faces of the hole sections lyophilic, simultaneously with removing the lyophobic film from same.

Desirably, the plasma processing uses a gas containing oxygen.

Desirably, the ions are ion species containing carbon.

Desirably, the ion species contain at least any of $CF_3^+$, $C_2F_6^+$ and $C_2F_3^+$.

Desirably, in the ion injection step, the ions are injected by a laser doping method.

Desirably, in the ion injection step, the ions are injected by a plasma doping method.

Desirably, the protective member is a tape.

Desirably, the protective member is the tape having a base material of a polyester film or a polyethylene film.

Desirably, the protective member contains a detachable acrylic adhesive.

In order to achieve an aforementioned object, the present invention is also directed to a nozzle plate, an inkjet head and an electronic device comprising a base material to which lyophobic properties are imparted by a lyophobic treatment method according to one aspect of the present invention. According to these modes of the inventions, it is possible to improve the liquid ejection performance and maintenance properties.

According to the present invention, after forming a lyophobic film on the surface of the base material and the inner wall faces of the hole section, a protective film is formed on top of the lyophobic film on the surface of the base material and the lyophobic film on the inner wall faces of the hole section of the base material is then removed. By selectively injecting ions (lyophobic species) which display lyophobic properties into at least the peripheral portion of the hole section opening in the surface of the base material, after removing the protective member, lyophobic properties are imparted to the excessively removed portion of the lyophobic film on the surface of the base material which arises due to insufficient adhesion of the protective member, or the like. Therefore, it is possible to carry out lyophobic treatment of the surface of the base material stably and reliably.

DESCRIPTION OF THE PREFERRED EMBODIMENTS

General Configuration of Inkjet Recording Apparatus

Figure 1:
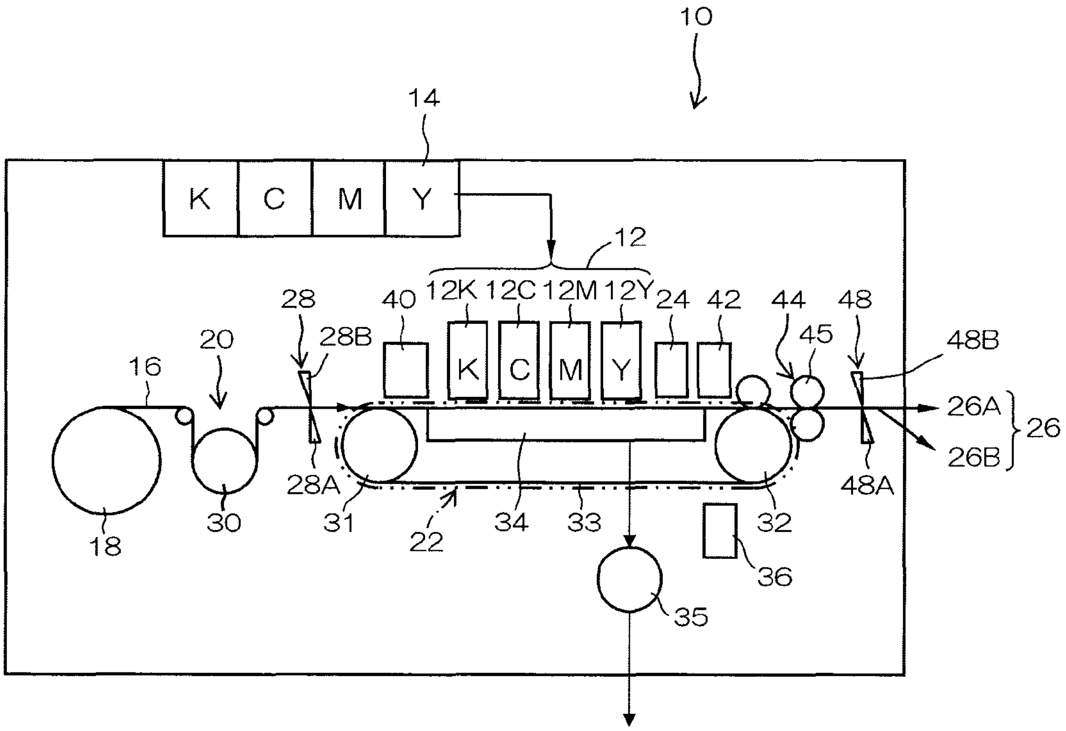
FIG. 1 is a general schematic drawing showing a general view of an inkjet recording apparatus.

FIG. 1 is a general configuration diagram of one embodiment of an inkjet recording apparatus according to an embodiment of the present invention. As illustrated in FIG. 1, the inkjet recording apparatus 10 comprises: a printing unit 12 having a plurality of inkjet heads (hereafter, also simply called "heads") 12K, 12C, 12M, and 12Y provided for the respective ink colors; an ink storing and loading unit 14 for storing inks of K, C, M and Y to be supplied to the printing heads 12K, 12C, 12M, and 12Y; a paper supply unit 18 for supplying recording paper 16; a decurling unit 20 removing curl in the recording paper 16; a suction belt conveyance unit 22 disposed facing the nozzle face (ink-droplet ejection face) of the printing unit 12, for conveying the recording paper 16 while keeping the recording paper 16 flat; a print determination unit 24 for reading the printed result produced by the printing unit 12; and a paper output unit 26 for outputting image-printed paper (printed matter) to the exterior.

In FIG. 1, a magazine for rolled paper (continuous paper) is shown as an example of the paper supply unit 18; however, more magazines with paper differences such as paper width and quality may be jointly provided. Moreover, papers may be supplied with cassettes that contain cut papers loaded in layers and that are used jointly or in lieu of the magazine for rolled paper.

In the case of the configuration in which roll paper is used, a cutter 28 is provided as illustrated in FIG. 1, and the continuous paper is cut into a desired size by the cutter 28. The cutter 28 has a stationary blade 28A, whose length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut papers are used, the cutter 28 is not required.

In the case of a configuration in which a plurality of types of recording paper can be used, it is desirable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is desirably controlled so that the recording paper 16 has a curl in which the surface on which the print is to be made is slightly round outward.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a plane.

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as illustrated in FIG. 1. The suction chamber 34 provides suction with a fan 35 to generate a negative pressure, and the recording paper 16 on the belt 33 is held by suction.

The belt 33 is driven in the clockwise direction in FIG. 1 by the motive force of a motor (not shown) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, and a combination of these. In the case of the configuration in which the belt 33 is nipped with the cleaning rollers, it is desirable to make the line velocity of the cleaning rollers different from that of the belt 33 to improve the cleaning effect.

A roller nip conveyance mechanism, in place of the suction belt conveyance unit 22, can be employed. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is desirable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
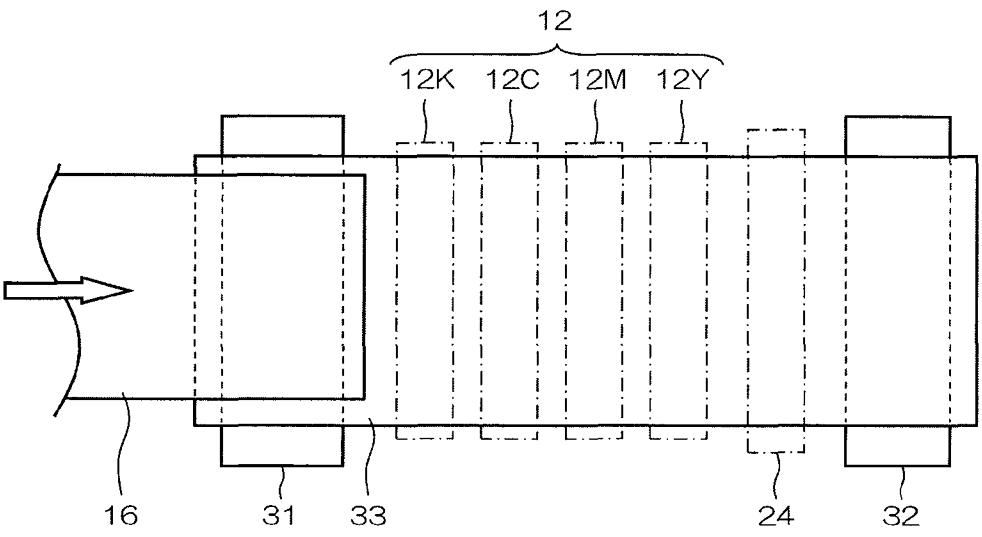
FIG. 2 is a principal plan diagram of the peripheral area of a printing unit in the inkjet recording apparatus illustrated in FIG. 1.

The printing unit 12 is a so-called "full line head" in which a line head having a length corresponding to the maximum paper width is arranged in a direction (main scanning direction) that is perpendicular to the paper conveyance direction (sub scanning direction). Each of the printing heads 12K, 12C, 12M, and 12Y constituting the printing unit 12 is constituted by a line head, in which a plurality of ink ejection ports (nozzles) are arranged along a length that exceeds at least one side of the maximum-size recording paper 16 intended for use in the inkjet recording apparatus 10 (see FIG. 2).

The printing heads 12K, 12C, 12M, and 12Y are arranged in the order of black (K), cyan (C), magenta (M), and yellow (Y) from the upstream side, along the feed direction of the recording paper 16 (hereinafter, referred to as the sub-scanning direction). A color image can be formed on the recording paper 16 by ejecting the inks from the printing heads 12K, 12C, 12M, and 12Y, respectively, onto the recording paper 16 while conveying the recording paper 16.

By adopting the printing unit 12 in which the full line heads covering the full paper width are provided for the respective ink colors in this way, it is possible to record an image on the full surface of the recording paper 16 by performing just one operation of relatively moving the recording paper 16 and the printing unit 12 in the paper conveyance direction (the sub-scanning direction), in other words, by means of a single sub-scanning action. Higher-speed printing is thereby made possible and productivity can be improved in comparison with a shuttle type head configuration in which a head reciprocates in a direction (the main scanning direction) orthogonal to the paper conveyance direction.

Although the configuration with the KCMY four standard colors is described in the present embodiment, combinations of the ink colors and the number of colors are not limited to those. Light inks or dark inks can be added as required. For example, a configuration is possible in which heads for ejecting light-colored inks such as light cyan and light magenta are added. Furthermore, there are no particular restrictions of the sequence in which the heads of respective colors are arranged.

As illustrated in FIG. 1, the ink storing and loading unit 14 has tanks for storing the inks of K, C, M and Y to be supplied to the heads 12K, 12C, 12M, and 12Y, and the tanks are connected to the heads 12K, 12C, 12M, and 12Y by means of channels, which are omitted from figures. The ink storing and loading unit 14 has a warning device (for example, a display device or an alarm sound generator) for warning when the remaining amount of any ink is low, and has a mechanism for preventing loading errors among the colors.

The print determination unit 24 has an image sensor (line sensor) for capturing an image of the ink-droplet deposition result of the printing unit 12, and functions as a device to check for ejection defects such as clogs of the nozzles in the printing unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern image printed by the heads 12K, 12C, 12M, and 12Y for the respective colors, and the ejection of each head is determined. The ejection determination includes measurement of the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is desirable to avoid contact with the printed surface until the printed ink dries, and a device that blows heated air onto the printed surface is desirable.

In cases in which printing is performed with dye-based ink on porous paper, blocking the pores of the paper by the application of pressure prevents the ink from coming contact with ozone and other substances that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are desirably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not illustrated in FIG. 1, the paper output unit 26A for the target prints is provided with a sorter for collecting prints according to print orders.

Structure of the Head

Next, the structure of heads 12K, 12C, 12M and 12Y will be described. The heads 12K, 12C, 12M and 12Y of the respective ink colors have the same structure, and a reference numeral 50 is hereinafter designated to any of the heads.

Figure 3A:
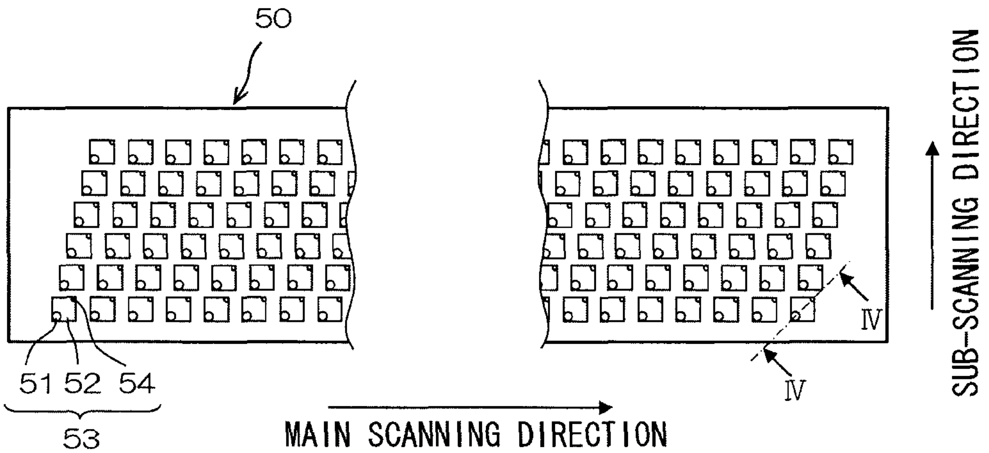
FIGS. 3A to 3C are plan view perspective diagrams showing examples of the composition of a printing head.
Figure 3B:
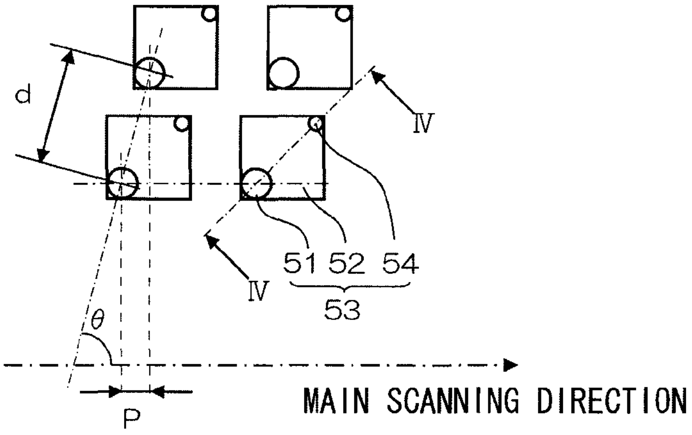
Figure 3C:
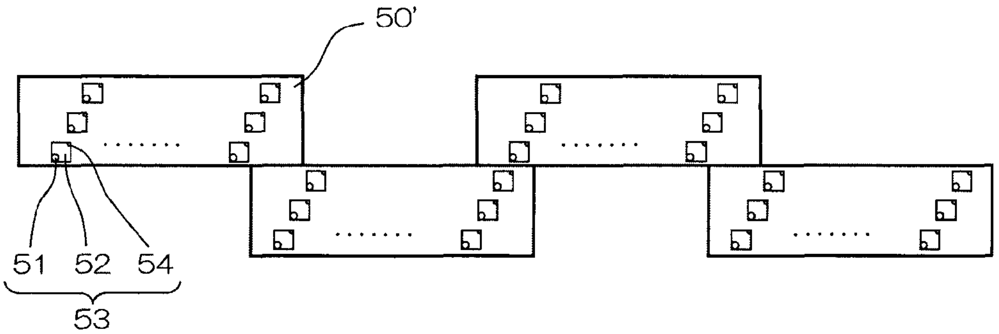
Figure 4:
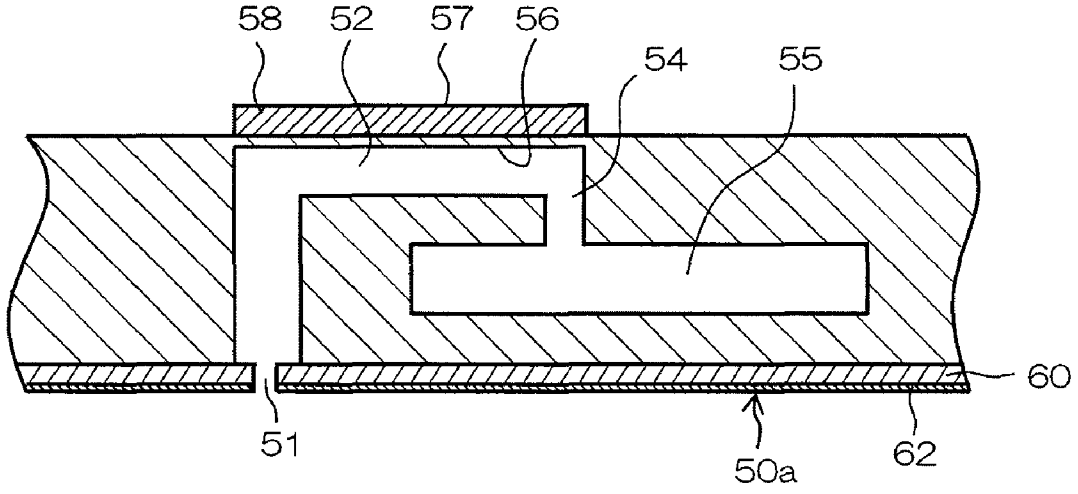
FIG. 4 is a cross-sectional diagram along line IV-IV in FIGS. 3A and 3B.

FIG. 3A is a plan perspective diagram showing an example of the structure of a head 50, and FIG. 3B is a partial enlarged diagram of same. Moreover, FIG. 3C is a plan view perspective diagram showing a further example of the structure of the head 50. FIG. 4 is a cross-sectional diagram showing the composition of an ink chamber unit (a cross-sectional diagram along line IV-IV in FIGS. 3A and 3B). Furthermore, FIGS. 5A to 5F are flow channel composition diagrams showing the structure of flow channels inside the head 50 (a plan view perspective diagram in direction A in FIG. 4).

The nozzle pitch in the head 50 should be minimized in order to maximize the density of the dots formed on the surface of the recording paper. As illustrated in FIGS. 3A and 3B, the head 50 according to the present embodiment has a structure in which a plurality of ink chamber units 53, each comprising a nozzle 51 forming an ink droplet ejection hole, a pressure chamber 52 corresponding to the nozzle 51, and the like, are disposed two-dimensionally in the form of a staggered matrix, and hence the effective nozzle interval (the projected nozzle pitch) as projected in the lengthwise direction of the head (the main scanning direction perpendicular to the paper conveyance direction) is reduced and high nozzle density is achieved.

The mode of forming one or more nozzle rows through a length corresponding to the entire width of the recording paper 16 in a direction substantially perpendicular to the paper conveyance direction is not limited to the example described above. For example, instead of the configuration in FIG. 3A, as illustrated in FIG. 3C, a line head having nozzle rows of a length corresponding to the entire width of the recording paper 16 can be formed by arranging and combining, in a staggered matrix, short head blocks (head chips) 50' having a plurality of nozzles 51 arrayed in a two-dimensional fashion. Furthermore, although not shown in the drawings, it is also possible to compose a line head by arranging short heads in one row.

As shown in FIG. 4, a plurality of nozzles (nozzle holes) 51 are formed in a nozzle plate (nozzle forming substrate) 60 which constitutes an ink ejection surface 50*a* of the head 50. The material used for the nozzle plate 60 is, for instance, a silicon material such as Si, $SiO_2$, SiN or quartz glass, a metal material such as Al, Fe, Ni, Cu or an alloy of these, an oxide material such as alumina or iron oxide, a carbonaceous material such as carbon black or graphite, or a resin material such as polyimide. Furthermore, a lyophobic layer 62 having lyophobic properties with respect to ink is provided on the surface (ink ejection surface) of the nozzle plate 60. The lyophobic treatment method for the surface of the nozzle plate 60 is described in detail below.

The pressure chambers 52 provided corresponding to the respective nozzles 51 are approximately square-shaped in planar form, and a nozzle 51 and a supply port 54 are provided respectively at either corner of a diagonal of each pressure chamber 52. Each pressure chamber 52 is connected via the supply port 54 to a common flow channel 55. The common channel 55 is connected to ink supply tanks (not illustrated) forming an ink supply source, and the ink supplied from the ink supply tanks is distributed and supplied to each pressure chamber 52 via the common channel 55.

Piezoelectric elements 58 respectively provided with individual electrodes 57 are bonded to a diaphragm 56 which forms the upper face of the pressure chambers 52 and also serves as a common electrode, and each piezoelectric element 58 is deformed when a drive voltage is supplied to the corresponding individual electrode 57, thereby causing ink to be ejected from the corresponding nozzle 51. When ink is ejected, new ink is supplied to the pressure chambers 52 from the common flow channel 55, via the ink inlet ports 54.

In the present example, a piezoelectric element 58 is used as an ink ejection force generating device which causes ink to be ejected from a nozzle 50 provided in a head 51, but it is also possible to employ a thermal method in which a heater is provided inside the pressure chamber 52 and ink is ejected by using the pressure of the film boiling action caused by the heating action of this heater.

As illustrated in FIG. 3B, the high-density nozzle head according to the present embodiment is achieved by arranging a plurality of ink chamber units 53 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 53 are arranged at a uniform pitch d in line with a direction forming an angle of θ with respect to the main scanning direction, the pitch P of the nozzles projected so as to align in the main scanning direction is $d \times \cos\theta$, and hence the nozzles 51 can be regarded to be equivalent to those arranged linearly at a fixed pitch P along the main scanning direction. Such configuration results in a nozzle structure in which the nozzle row projected in the main scanning direction has a high nozzle density of up to 2,400 nozzles per inch.

When implementing the present invention, the arrangement structure of the nozzles is not limited to the example shown in the drawings, and it is also possible to apply various other types of nozzle arrangements, such as an arrangement structure having one nozzle row in the sub-scanning direction.

Furthermore, the scope of application of the present invention is not limited to a printing system based on a line type of head, and it is also possible to adopt a serial system where a short head which is shorter than the breadthways dimension of the recording paper 16 is scanned in the breadthways direction (main scanning direction) of the recording paper 16, thereby performing printing in the breadthways direction, and when one printing action in the breadthways direction has been completed, the recording paper 16 is moved through a prescribed amount in the direction perpendicular to the breadthways direction (the sub-scanning direction), printing in the breadthways direction of the recording paper 16 is carried out in the next printing region, and by repeating this sequence, printing is performed over the whole surface of the printing region of the recording paper 16.

Lyophobic Treatment Method

Next, examples of a lyophobic treatment method relating to an embodiment of the present invention will be described.

Figure 5A:
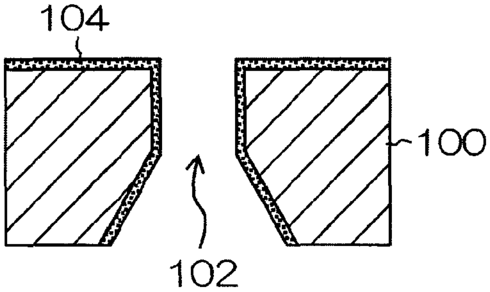
FIGS. 5A to 5F are illustrative diagrams showing one example of a lyophobic treatment method relating to an embodiment of the present invention.
Figure 5B:
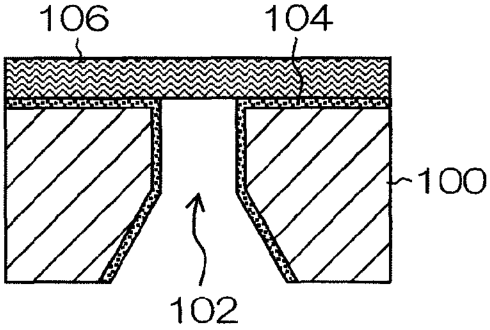
Figure 5C:
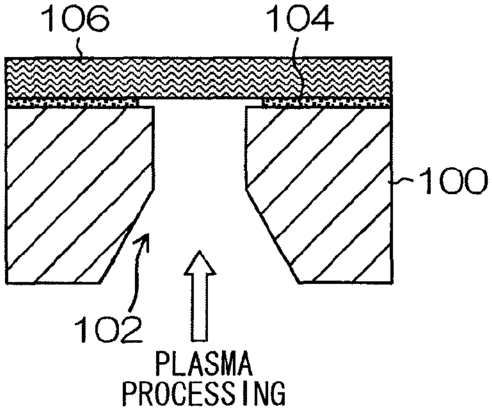
Figure 5D:
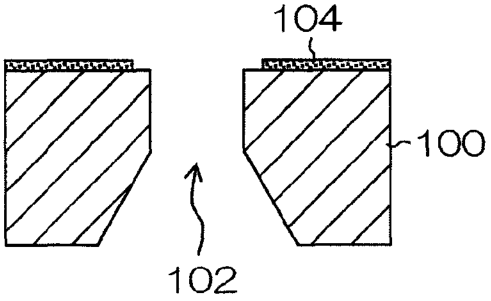
Figure 5E:
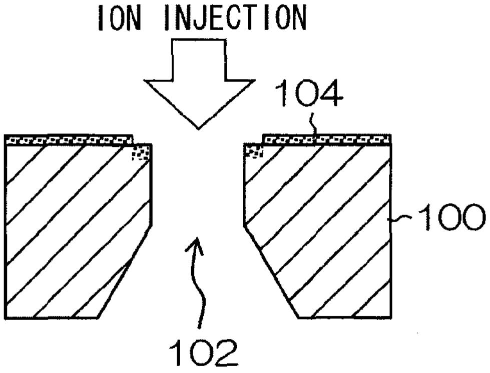

FIGS. 5A to 5F are illustrative diagrams showing a lyophobic treatment method relating to an embodiment of the present invention. Here, a method of forming a lyophobic film on the surface (ink ejection surface) of a nozzle forming substrate 100 (corresponding to the nozzle plate 60 in FIG. 4) which has nozzle holes 102, as shown in FIG. 5E, will be described as a lyophobic treatment method.

The lyophobic treatment method relating to the present embodiment comprises: a step of forming a lyophobic film 104 on the surface of the nozzle forming substrate 100 and the inner wall faces of the nozzles (lyophobic film forming step); a step of forming a protective member 106 on the lyophobic film 104 on the surface of the nozzle forming substrate 100 (protective member forming step); a step of removing the lyophobic film 104 of the nozzle forming substrate 100 on the inner wall faces of the nozzles (lyophobic film removal step); a step of removing the protective member 106 on the lyophobic film 104 on the surface of the nozzle forming substrate 100 (protective member removal step); and a step of injecting ions having lyophobic properties into at least the peripheral sections of the openings of the nozzle holes 102 on the surface of the nozzle forming substrate 100 (ion injection step). The respective steps are described below.

Lyophobic Film Forming Step

Firstly, as shown in FIG. 5A, a lyophobic film 104 is formed on the surface (ink ejection surface) of the nozzle forming substrate 100 having nozzle holes 102 and on the inner wall faces of the nozzles. There are no particular restrictions on the method of forming the lyophobic film 104, provided that the method allows the film to be removed in the lyophobic film removal step which is described below.

For the lyophobic film 104, it is possible to use a metal alkoxide lyophobic film, a silicon lyophobic film, a fluorine-containing lyophobic film, or the like, formed by, for example, a dry process such as physical vapor phase epitaxy (vapor deposition, sputtering, or the like), chemical vapor phase epitaxy (CVD, ALD, or the like), or a wet process such as an application method.

Furthermore, it is also possible to use a lyophobic film (a lyophobic film formed on the surface of a plasma polymer film) which is described in Japanese Patent Application No. 2008-245522 and Japanese Patent Application No. 2008-334527 which are the subject of previous applications.

In the present embodiment, it is desirable to use a resin type lyophobic film as the lyophobic film 104, and the durability of the resin lyophobic film can be improved by carrying out an annealing process which is described below.

There are no particular restrictions on the shape of the nozzle holes 102, but from the viewpoint of stabilizing ejection, it is desirable that the nozzles should have a tapered shape or a funnel shape which narrows toward the ink ejection direction (the upward direction in FIGS. 5A to 5F) (funnel-shaped nozzle holes are depicted as one example in FIGS. 5A to 5F).

Protective Member Forming Step

After forming the lyophobic film 104, as shown in FIG. 5B, a protective member 106 is formed on the lyophobic film 104 on the surface of the nozzle forming substrate 100. For example, it is possible to use, for the protective member 106, a resin member such as an ultraviolet-curable resin, a metal or ceramic jig which covers and protects the nozzle surface, a protective tape, such as masking tape, or the like. A tape-shaped member is desirable, due to having excellent handling properties and enabling easy formation and detachment. More specifically, the protective tape may be attached on top of the lyophobic film 104 on the surface of the nozzle forming substrate 100.

In the present embodiment, a desirable mode is one which uses a masking tape having a detachable (removable) acrylic adhesive on the surface of a base material, as the protective member 106. According to this mode, since a technique for attaching a masking tape is employed rather than attaching an elastic body plate, then productivity is high, and since a solvent such as butyl acetate is not used, then problems of environmental impact do not arise. Furthermore, since a masking tape having a detachable acrylic adhesive on the surface of a base material is used, then the masking tape can be detached easily and therefore productivity is high in this respect as well.

A more desirable mode is one where the base material of the masking tape is constituted by a polyester film or polyethylene film in the above embodiment. In the lyophobic treatment method according to an embodiment of the present invention, it is possible to use various materials as the base material of the masking tape, but it is also possible to maintain the strength of the tape even after the effects of plasma processing, by using polyester film or polyethylene film as the base material of the masking tape.

Furthermore, the protective member 106 may adopt a mode which employs an elastic sheet made of silicone rubber or fluorine rubber, or a dry film. However, in a mode which uses an elastic sheet, there is a possibility that productivity is poor. Furthermore, in a mode which uses a dry film, the dry film should be dissolved and removed by butyl acetate after removing the lyophobic film 104 on the inner wall faces of the nozzles, and hence there is a problem of environmental impact. On the other hand, a mode using a protective tape (more desirably, a masking tape having detachable acrylic adhesive) as the protective member 106 as in the present embodiment is desirable since the productivity is good and there are no problems in relation to environmental impact.

Lyophobic Film Removal Step

After forming the protective member 106, as shown in FIG. 5C, plasma processing is carried out from the rear surface side of the nozzle forming substrate 100 (the opposite surface to the ink ejection surface). For example, as described in the specification of Japanese Patent Application Publication No. 2007-261070, plasma processing should be carried out for 5 to 20 minutes using argon gas formed into a plasma at atmospheric pressure, at 120 to 180 W, power of 45 to 180 W, and flow rate of 45 to 75 sccm. Consequently, the portion of the lyophobic film 104 which is not masked by the protective member 106 is decomposed by the argon gas that has been converted into a plasma, and the lyophobic film 104 can thus be removed from the inner wall faces of the nozzles. Furthermore, the gas which can be used for the plasma should be one having little effect on the nozzle forming substrate 100 and one that is capable of removing the organic film 104. For example, this gas is an inert gas such as argon or helium, or nitrogen, oxygen or a mixture of these, or the like. In particular, in the case of plasma processing by means of a gas containing oxygen, it is possible to render the inner wall faces of the nozzles lyophilic simultaneously with removing the organic film 104, and hence productivity can be improved.

The method of removing the lyophobic film 104 is not limited to the plasma process described above, and an irradiation process using an energy beam of ultraviolet light or an electron beam, or ozone gas processing (more desirably, a high-purity ozone gas process), for example, are desirable, and similar beneficial effects to a plasma process can be obtained.

Protective Member Removal Step

After the plasma process, as shown in FIG. 5D, the protective member 106 on the lyophobic film 104 on the surface of the nozzle forming substrate 100 is removed. For example, if a masking tape having a detachable acrylic adhesive is used as the protective member 106, then it is possible readily to detach the masking tape which has been attached to the lyophobic film 104 on the surface of the nozzle forming substrate 100, and therefore productivity can be raised.

Ion Injection Step

As shown in FIG. 5E, after removing the protective member 106, ions having lyophobic properties (lyophobic pieces) are injected into at least the peripheral portions of the openings of the respective nozzle holes 102, on the surface of the nozzle forming substrate 100 (hereinafter, called "nozzle opening peripheral portions"). In this, the ions injected are, for instance, fluorine ions, such as $C_2F_4^+$ ions, or the like.

As the method of injecting ions, it is possible to use an ion injection method such as that described in Japanese Patent Application Publication No. 6-316079 (it is also possible to employ a method which irradiates a laser simultaneously with the ion injection). By means of an ion injection method, it is possible to inject ions into semiconductors (silicon, etc.), glass, ceramic, oxides of semiconductors, organic polymers, organic compounds such as organic resin, or inorganic compounds, and this type of method has a benefit in that a broad range of materials can be selected as the base material of an inkjet head.

With regard to the conditions of the ion injection method, the ion source used is any gas containing at least chlorine and fluoride, such as $CF_4$, $C_2F_6$, $CHF_3$, or the like, which is a gas at normal pressure and reduced pressure, or a combination of a gas containing fluorine and a gas containing carbon, such as $F_2+CH_4$, or the like. Moreover, if the material which is to be ion injected contains carbon, then a gas containing fluorine only is sufficient. Furthermore, for the ion species, it is desirable to use any ion species which contains carbon and fluorine generated from the ion source, such as $CF_3^+$, $C_2F_6^+$, $C_2F_3^+$ ions, or the like, or a combination of $F^+$ ions and $C^+$ ions. Moreover, if the material which is to be ion injected contains carbon, then $F^+$ ions alone are sufficient.

The ion beam diameter should be a diameter which enables irradiation onto at least a region including the nozzle opening peripheral portion (lyophobic film excessive removal portion). For example, if the nozzle diameter is 50 μm, then processing is carried out with an ion beam diameter of 0.5 to 50 μm.

Figure 6A:
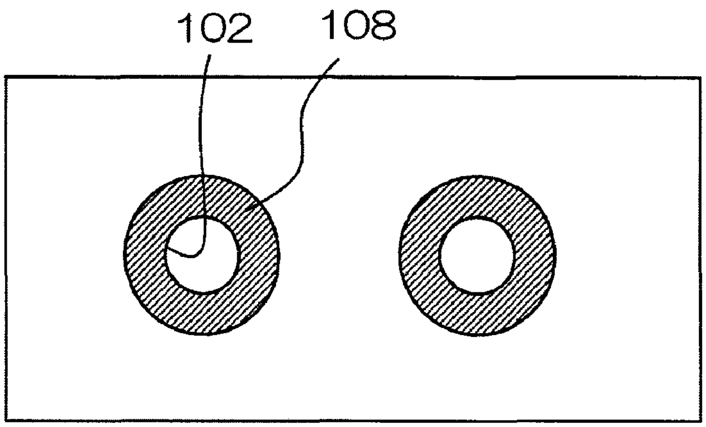
FIGS. 6A to 6C are enlarged plan diagrams showing a portion of the nozzle forming substrate.
Figure 6B:
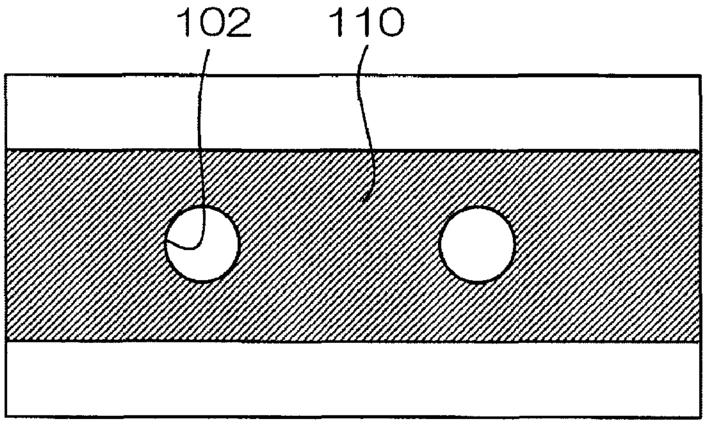
Figure 6C:
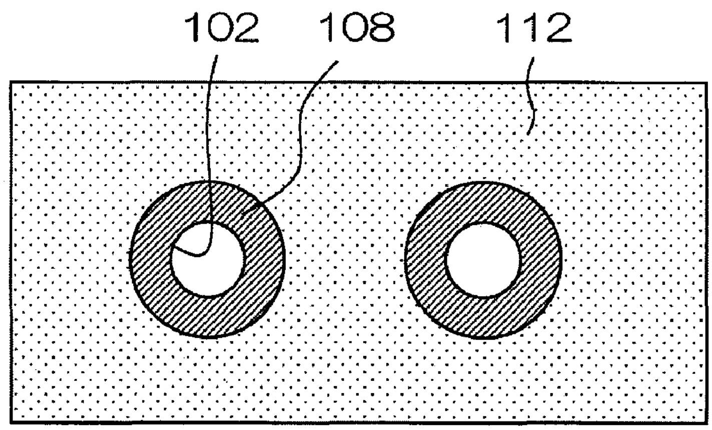
Figure 7A:
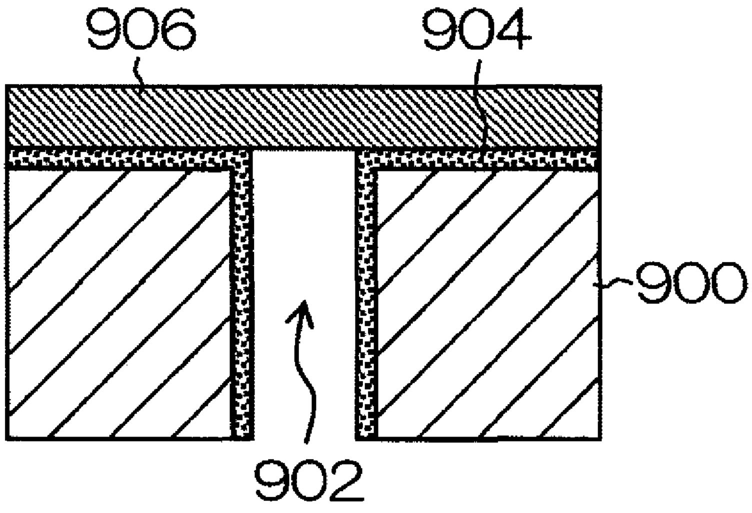
FIG.7A RELATED ART
FIGS. 7A and 7B are illustrative diagrams showing problems relating to a related art.
Figure 7B:
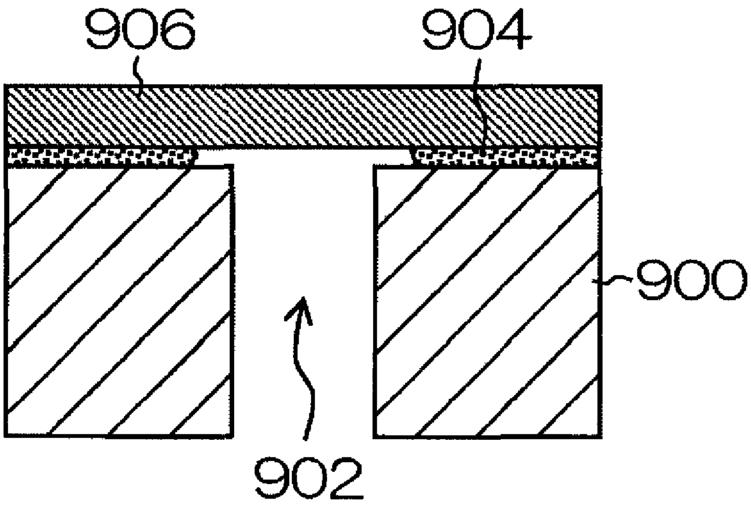
FIG.7B RELATED ART

Furthermore, possible modes of the ion injection region are a mode where ion injection is carried out selectively only in a donut-shaped region 108 formed in the opening peripheral portion of each nozzle hole 102, as shown in FIG. 6A, or a mode where ion injection is carried out in a linear region 110 which includes the opening peripheral portions of a plurality of nozzle holes 102 by scanning the ion injection apparatus (not illustrated) along a nozzle row comprising a plurality of nozzle holes 102, as shown in FIG. 6B.

According to a mode in which ion injection is carried out in a donut-shaped region as shown in FIG. 6A, since the ion injection region is limited, it is possible to restrict the processing time relating to ion injection and productivity can be improved. Furthermore, according to a mode in which ion injection is carried out in a linear region 110 as shown in FIG. 6B, compared to a mode in which ion injection is carried out in a donut-shaped region 108 as shown in FIG. 6A, it is possible to carry out ion injection processing accurately and rapidly with respect to the opening peripheral portions of the plurality of nozzle holes 102, and hence this is a desirable mode for lyophobic treatment of a nozzle plate which constitutes an inkjet head having high density.

Moreover, if ion injection is carried out while scanning the ion injection apparatus along the nozzle row, as shown in FIG. 6B, it is possible to carry out ion injection in a state where a mask 112 in which a pattern of openings corresponding to the nozzle holes 102 are formed is disposed on top of the nozzle forming substrate 100. The mask 112 is not limited to a hard mask such as an oxide film ($SiO_2$ film), nitride film (SiN film), metal (alumina, chrome, titanium, or the like), and may also be a resist mask. According to the present mode, by carrying out ion injection while scanning the ion injection apparatus along the nozzle row, it is possible to carry out ion injection only into donut-shaped regions 108 which are formed in the opening peripheral portions of the respective nozzle holes 102, as well as being able to achieve fast and accurate processing. However, when using a mask 112, it is necessary to align the positions of the opening patterns formed in the mask with the positions of the nozzle holes 102.

Furthermore, as another method for injecting ions, it is possible to use laser doping or plasma doping. If a laser doping method is used, then high-speed and low-temperature processing is possible and ions can be injected into the surface at high density. Furthermore, by adopting a plasma doping method, it is possible to process a large surface area at a low temperature.

In this way, by modifying the surface of the nozzle forming substrate 100 by injecting ions having lyophobic properties (fluorine ions, or the like) selectively into the nozzle opening peripheral portions of the surface, it is possible to achieve partial repair by imparting lyophobic properties to excessively removed portions of the lyophobic film (nozzle opening peripheral portions) which arise due to insufficient adhesion of the protective member 106, or the like, and therefore ejection stability and maintenance characteristics can be improved.

Heat Treatment Step

If a resin lyophobic film is employed as the lyophobic film 104, desirably, an annealing treatment of the nozzle forming substrate 100 is carried out after performing ion injection as described above. By carrying out an annealing treatment, the degree of polymerization of the resin type lyophobic film is raised, the durability is improved, and at the same time, the lyophobic properties of the ion injection portion (in other words, the nozzle opening peripheral portions) are also improved.

It is also possible to increase the degree of polymerization of the resin type lyophobic film in a mode where annealing is not carried out and the substrate is left at normal temperature (for several days), but a mode in which annealing is carried out enables faster processing.

The processing temperature during annealing should be at or below a temperature at which the resin type lyophobic film does not evaporate, and the temperature and processing time should be selected appropriately in accordance with the film used.

For instance, in the case of a fluorine-containing lyophobic film, such as a fluorocarbon-containing lyophobic film (heptadecafluoro-1,1,2,2-tetrahydrodecyl) trichlorosilane: $C_{10}H_4C_{13}F_{17}Si$, when the film is formed on the substrate, since the material evaporates at 300° C., then the annealing temperature is 50° C. to 300° C. and desirably 100° C. to 250° C., the processing time is several minute to several tens of hours, and the higher the temperature, the shorter the processing time that can be used.

The heating apparatus may be a thermostatic tank, an infrared furnace, laser annealing, or the like. Furthermore, it is also possible to employ a method which carries out ion injection simultaneously with laser annealing.

Figure 5F:
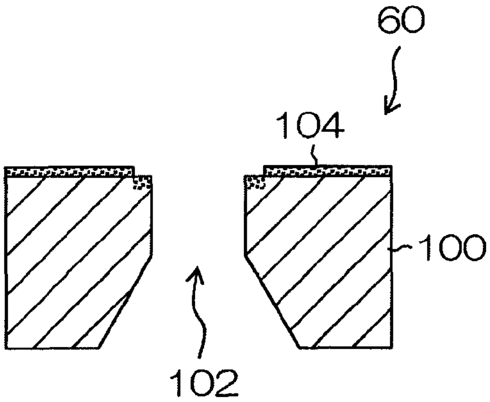

In this way, as shown in FIG. 5F, a lyophobic film 104 is formed on the surface of the nozzle forming substrate 100, and furthermore repair is performed to impart lyophobic properties to the excessively removed portion of the lyophobic film by injecting ions (fluorine ions, or the like) displaying lyophobic properties into the nozzle opening peripheral portions, and the nozzle plate 60 shown in FIG. 4 can be obtained.

According to the present embodiment, after forming a lyophobic film 104 on the surface and the inner wall faces of the nozzle forming substrate 100, a protective member 106 is formed on the lyophobic film 104 on the surface of the nozzle forming substrate 100, and the lyophobic film 104 on the inner wall faces of the nozzles in the nozzle forming substrate 100 is then removed by carrying out a plasma process from the rear surface side of the nozzle forming substrate 100. Thereupon, after removing the protective member 106, fluorine ions, or the like, are injected selectively as ions showing lyophobic properties (lyophobic species) into at least the opening peripheral portions of the nozzle holes 102 (nozzle opening peripheral portions) of the surface of the nozzle forming substrate 100, whereby lyophobic properties are imparted to the excessively removed portions of the lyophobic film which have arisen due to insufficient adhesion of the protective member 106, or the like. By this means, it is possible to carry out a lyophobic treatment of the surface of the nozzle forming substrate 100 stably and reliably, and hence the ink ejection stability and the maintenance properties of an inkjet head comprising the nozzle forming substrate 100 can be improved.

Furthermore, if a resin type lyophobic film is used as the lyophobic film 104, then by carrying out an annealing process after ion injection, the degree of polymerization of the resin type lyophobic film is raised, durability is improved, and at the same time, the lyophobic properties of the nozzle opening peripheral portions, which are the portions where ions are injected, can be improved.

The method of lyophobic treatment of the surface of the nozzle forming substrate 100 might also be a method which injects ions displaying lyophobic properties into the whole surface of the nozzle forming substrate 100, but a method of this kind would be problematic due to high cost and long processing time. Moreover, it is difficult to ensure the maintenance properties of the whole nozzle plate simply by injecting ions only into the nozzle opening peripheral portions of the surface of the nozzle forming substrate 100.

As opposed to this, in the present embodiment, after forming a lyophobic film 104 by a dry process (for example, CVD) which enables easy processing of a large surface area over the whole of the surface of the nozzle forming substrate 100, ion injection is carried out partially into the nozzle opening peripheral portions where excessive removal of the lyophobic film is liable to occur due to insufficient adhesion of the protective member 106, and the like, thereby imparting lyophobic properties to these portions, and therefore it is possible to restrict the overall processing time and to reduce costs.

Furthermore, a lyophobic film formed on the surface of the nozzle plate by a conventional method is problematic in that when a wiping process is carried out by a blade or the like during maintenance, the lyophobic film peels off in the nozzle opening peripheral portions and the lyophobic film deteriorates due to ink ejection, and so on. However, according to the lyophobic treatment method of the present embodiment, lyophobic properties are imparted to the nozzle opening peripheral portions by injecting ions (lyophobic species) displaying lyophobic properties into these portions, and therefore it is possible to resolve the conventional problems described above, without needing to take account of the hardness of the lyophobic film or the adhesion thereof with the substrate (nozzle forming substrate 100).

In the present embodiment, a method of performing lyophobic treatment of the surface of a nozzle forming substrate 100 having nozzle holes 102 is described as one example of the lyophobic treatment method relating to an embodiment of the present invention, but the present invention is not limited to this and can also be applied similarly to performing a lyophobic treatment on the surface of a substrate (structural body) in which hole sections such as liquid flow channels (ink flow channels) are formed.

Lyophobic treatment methods, nozzle plates, inkjet heads and electronic devices according to embodiments of the present invention have been described in detail above, but the present invention is not limited to the aforementioned examples, and it is of course possible for improvements or modifications of various kinds to be implemented, within a range which does not deviate from the essence of the present invention.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lyophobic treatment method for imparting lyophobic properties to a surface of a base material having a hole section, comprising:

a lyophobic film forming step of forming a lyophobic film on the surface and inner wall faces of the hole section of the base material;

a protective member forming step of forming a protective member on the lyophobic film on the surface of the base material;

a lyophobic film removal step of removing the lyophobic film on the inner wall faces of the hole section of the base material;

a protective member removal step of removing the protective member on the lyophobic film on the surface of the base material; and an ion injection step of injecting ions exhibiting lyophobic properties into at least a peripheral portion of an opening of the hole section in the surface of the base material.

2. The lyophobic treatment method as defined in claim 1, wherein the lyophobic film is a resin type lyophobic film, the method further comprising a heating step of heating the base material after carrying out the ion injection step.

3. The lyophobic treatment method as defined in claim 2, wherein the resin type lyophobic film is a fluorine resin type lyophobic film.

4. The lyophobic treatment method as defined in claim 1, wherein the ions are injected by an ion injection method.

5. The lyophobic treatment method as defined in claim 1, wherein the ions are ion species containing at least fluorine.

6. The lyophobic treatment method as defined in claim 5, wherein the ions are ion species containing carbon.

7. The lyophobic treatment method as defined in claim 5, wherein the ion species contain at least any of $CF_3^+$, $C_2F_6^+$ and $C_2F_3^+$.

8. The lyophobic treatment method as defined in claim 1, wherein in the ion injection step, the ions are injected only into a donut-shaped region surrounding a margin of the opening of the hole section in the surface of the base material.

9. The lyophobic treatment method as defined in claim 1, wherein the base material has a plurality of hole sections; and in the ion injection step, the ions are injected into a linear-shaped region extending across the plurality of hole sections in the surface of the base material.

10. The lyophobic treatment method as defined in claim 9, wherein in the ion injection step, the ions are injected via a mask having a pattern of openings corresponding to the plurality of hole sections.

11. The lyophobic treatment method as defined in claim 1, wherein the lyophobic film on the inner wall faces of the hole section of the base material is removed by plasma processing.

12. The lyophobic treatment method as defined in claim 11, wherein the plasma processing uses a gas containing oxygen.

13. The lyophobic treatment method as defined in claim 1, wherein in the ion injection step, the ions are injected by a laser doping method.

14. The lyophobic treatment method as defined in claim 1, wherein in the ion injection step, the ions are injected by a plasma doping method.

15. The lyophobic treatment method as defined in claim 1, wherein the protective member is a tape.

16. The lyophobic treatment method as defined in claim 15, wherein the protective member is the tape having a base material of a polyester film or a polyethylene film.

17. The lyophobic treatment method as defined in claim 15, wherein the protective member contains a detachable acrylic adhesive.

18. A nozzle plate comprising a base material to which lyophobic properties are imparted by the lyophobic treatment method as defined in claim 1.

19. An inkjet head comprising the nozzle plate as defined in claim 18.

20. An electronic device comprising the inkjet head as defined in claim 19.

* * * * *